United States Patent
Udaya et al.

(10) Patent No.: US 12,189,801 B2
(45) Date of Patent: Jan. 7, 2025

(54) CROSS-LANDSCAPE PACKAGE REPLICATION

(71) Applicant: SAP SE, Walldorf (DE)

(72) Inventors: Sahana Durgam Udaya, Bangalore (IN); Prasadh S, Madurai (IN); Abhishek Nagendra, Bangalore (IN)

(73) Assignee: SAP SE, Walldorf (DE)

( * ) Notice: Subject to any disclaimer, the term of this patent is extended or adjusted under 35 U.S.C. 154(b) by 320 days.

(21) Appl. No.: 17/738,665

(22) Filed: May 6, 2022

(65) Prior Publication Data

US 2023/0359753 A1   Nov. 9, 2023

(51) Int. Cl.
*G06F 16/25* (2019.01)
*G06F 16/27* (2019.01)
*G06F 21/62* (2013.01)

(52) U.S. Cl.
CPC .......... *G06F 21/6218* (2013.01); *G06F 16/25* (2019.01); *G06F 16/27* (2019.01)

(58) Field of Classification Search
None
See application file for complete search history.

(56) References Cited

U.S. PATENT DOCUMENTS 10,754,741 B1 * 8/2020 Sethuramalingam ... G06F 16/25
10,952,222 B1 * 3/2021 Wires ....................... G06F 16/27
2016/0330279 A1 * 11/2016 Patel .................... G06F 16/2358
2022/0012265 A1 * 1/2022 Salame ................. G06F 16/273
2022/0414112 A1 * 12/2022 Chandrasekaran ... G06F 16/213

OTHER PUBLICATIONS

"SAP Analytics Cloud Help", SAP Health Portal, Jun. 7, 2022, 6 pages.

* cited by examiner

*Primary Examiner* — Son T Hoang
(74) *Attorney, Agent, or Firm* — Fountainhead Law Group, PC

(57) ABSTRACT

Content packages (including, e.g., visualizations, models) are replicated from one landscape to another that is restricted. The restricted landscape may be governed by regulations relating to privacy or other concerns. For package replication, a poll-pull mechanism is applied. Specifically, the first landscape creates a replicate package job targeting to the restricted landscape. The restricted landscape periodically polls and checks for any replicate package job for targeted for it. If any targeted replicate package jobs are discovered by polling, the restricted landscape will pull the job details to create a new replicate package job in its own (restricted) landscape. Under this approach, even though the replicate package job was initiated in the first landscape, it will be executed in the restricted landscape, thereby conforming to any governing regulations. Package replication job status may be determined by the restricted replicate package job propagating its job state to the first landscape's replicate job.

20 Claims, 16 Drawing Sheets

CROSS-LANDSCAPE PACKAGE REPLICATION

BACKGROUND

Unless otherwise indicated herein, the approaches described in this section are not prior art to the claims in this application and are not admitted to be prior art by inclusion in this section.

Multiple software applications are increasingly subject to complex deployments in one or more cloud environments. In one possible example, software used to perform analytics upon current activity, may need to efficiently communicate with separate applications relating to availability of resources and forecasting of future activity.

Analytics content may take several forms, including but not limited to models, stories, and visualizations. Effectively sharing such analytics content across different landscapes can play a central role in permitting the discovering the unseen patterns in order to boost future productivity.

SUMMARY

Embodiments accomplish replication of a content package (including, e.g., visualizations and models) from one landscape to another that is restricted. The restricted landscape may be governed by regulations relating to privacy or other concerns. For package replication, a poll-pull mechanism is applied. Specifically, the first landscape creates a replicate package job targeting to the restricted landscape. The restricted landscape periodically polls and checks for any replicate package job for targeted for it. If any targeted replicate package jobs are discovered by polling, the restricted landscape will pull the job details to create a new replicate package job in its own (restricted) landscape. Under this approach, even though the replicate package job was initiated in the first landscape, it will be executed in the restricted landscape, thereby conforming to any governing regulations. The status of the package replication job may be accurately determined the replicate package job propagating its current job state to the first landscape replicate package job. This accomplishes synchronizing the job status across the different landscapes.

The following detailed description and accompanying drawings provide a better understanding of the nature and advantages of various embodiments.

DETAILED DESCRIPTION

Described herein are methods and apparatuses that perform replication of packages across computer system landscapes. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
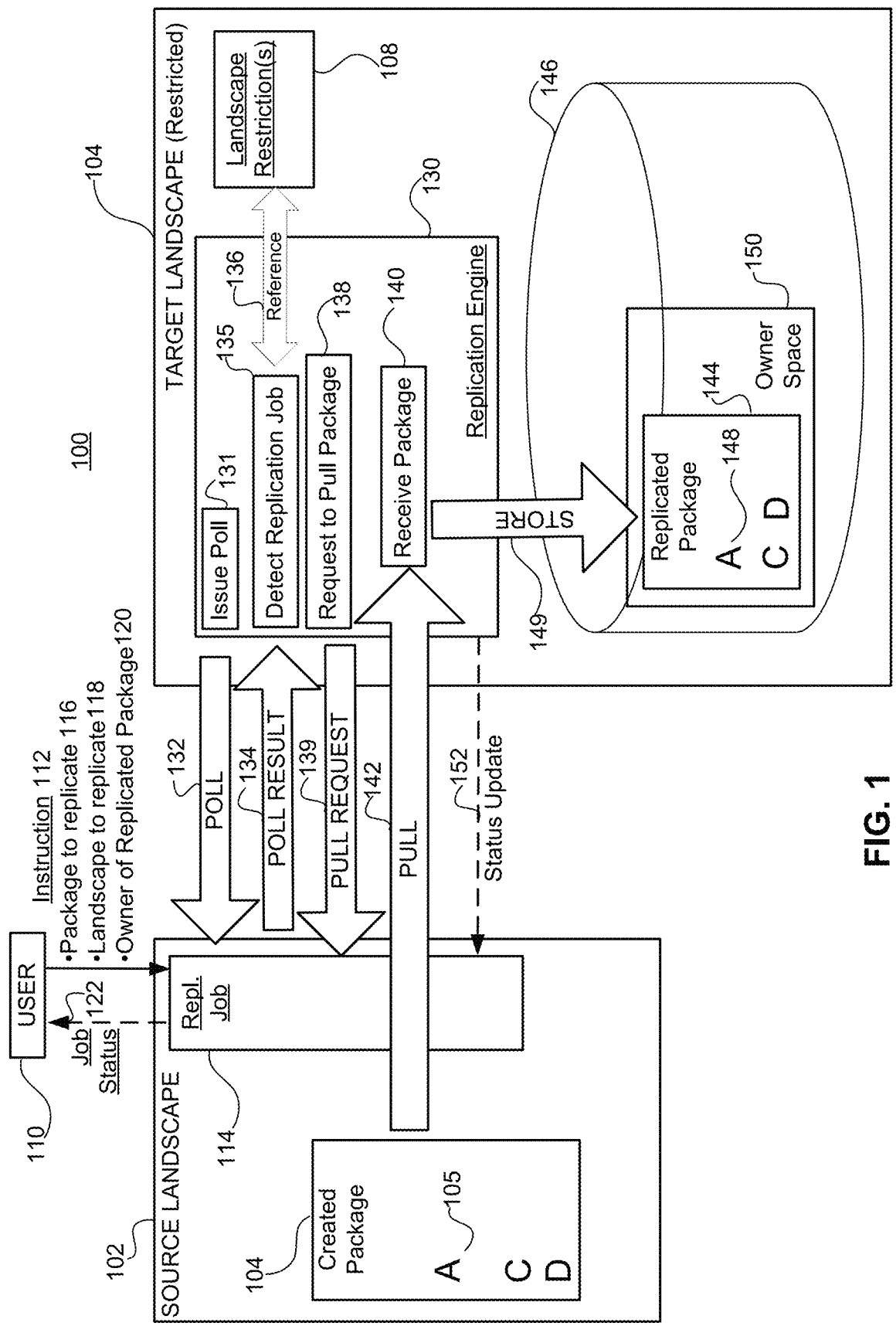
FIG. 1 shows a simplified diagram of a system according to an embodiment.

FIG. 1 shows a simplified view of an example system that is configured to implement metadata-based generic parsing according to an embodiment.

Specifically, system 100 comprises a first, source landscape 102 comprising a content package 104 that has been created. Here, as a simplified example, the content package comprises data and metadata corresponding to content types 105 A, C, and D.

The package may have been earlier created by a user selecting desired objects, and providing metadata information such as package name. In some embodiments, the operation for creating a package can be termed an export. Wherever the package is created, that particular tenant is the owner of the package.

The first landscape is in communication with a second landscape 106 that is restricted in some manner. In particular, the second landscape may include restrictions 108 governing the nature of content that may be present. Examples of such restrictions may be imposed by data privacy regulations that are in force in a particular jurisdiction.

It is noted that the source landscape itself may (but need not be) restricted in some manner. This is simplistically illustrated in FIG. 1, in that the package is not originally created with an (existing but restricted) content type B.

Under some circumstances, it may be desired for the original content package to be shared across landscapes with different tenants. For such package sharing a same, single package maintains its owner as the creator tenant. A user can decide access levels to the single package. Changes made to the package (e.g., adding new objects, etc,) can be accessed by shared tenants by performing a re-import. At the conclusion of such package sharing, there remains only a single package that is being shared with other tenants.

By contrast, alternatively it may be desired for the content package to be replicated from the source landscape to the second, restricted landscape. Unlike package sharing, such replication results in two packages: the original package and a separate, replicated package that is present in the restricted landscape.

The owner of the original package is the source tenant, and the owner of replicated package is target tenant. Changes made to the original source package (such as adding new objects, etc.) are not automatically propagated to the replicate, target package.

FIG. 1 shows details of such package replication according to an embodiment. First, the source landscape receives from the user 110, instruction 112 to perform a replication job 114. These instructions can include but are not limited to one or more of:

identity 116 of the package to be replicated;
identity 118 of the target landscape in which the package is to be replicated; and
identity 120 of the owner of the replicated package.

Based upon the instruction, the source landscape creates and executes the replication job. The source landscape returns to the user, a current status 122 of the replication job.

Sometime after the generation of the replication job, replication engine 130 of the restricted target landscape issues 131 a poll 132 to the source landscape. In return, the replication engine receives a poll result 134 indicating the existence of the replication job 135 in the source landscape. This allows the target landscape, to detect that a package is available for reproduction.

Next, the replication engine references 136 the landscape restrictions 108, in order to create a replication job of its own. This replication job is governed by the restrictions of the target landscape, and hence in this simplified example the replication engine will not request package content to which it is not entitled.

The replication engine then formulates a request to 138 to pull the replicated package (including only content allowed by the restriction), from the source landscape. Then, the replication engine issues 139 the pull request to the source landscape.

In return, the engine receives the replicated package 140 pulled 142 from the source landscape. The replicated package is stored 144 in non-transitory computer readable storage medium 146.

The replicated package may be stored 149 within a designated owner space 150 within the non-transitory computer readable storage medium. Such an owner space may be defined, for example, by a referential database.

The replication engine returns to the replication job of the source system, an update of the status 152 of the replication job in the target system.

Figure 2:
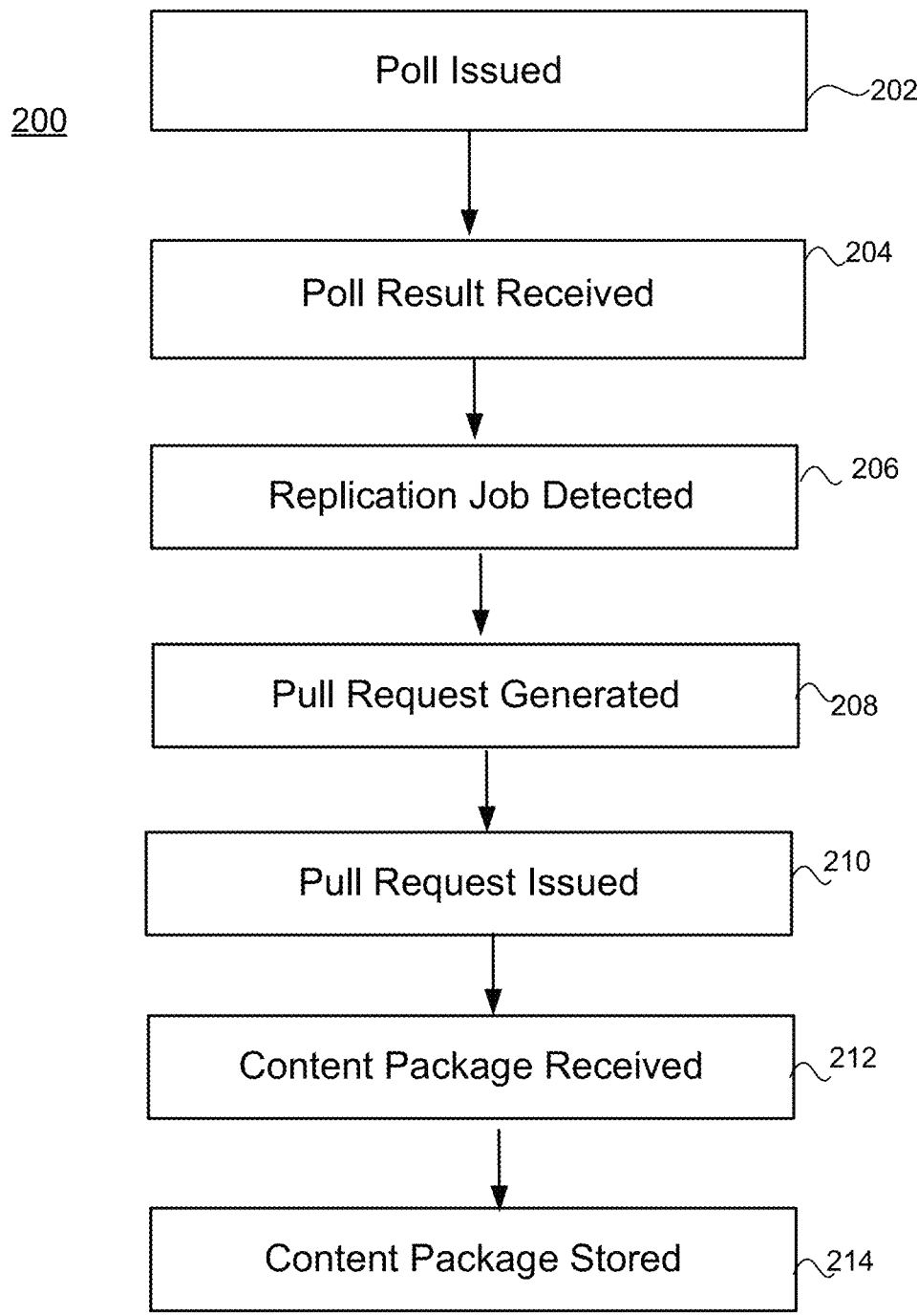
FIG. 2 shows a simplified flow diagram of a method according to an embodiment.

FIG. 2 is a flow diagram of a method 200 according to an embodiment. At 202, a poll is issued to a source landscape.

At 204, a poll result is received indicating a first replication job including a data type of the first landscape. At 206, the first replication job is detected from the poll result.

At 208, a restriction is referenced to generate a pull request. At 210, the pull request is issued to the source landscape.

At 212 a content package is received. At 214, the content package is stored.

Further details regarding package replication according to various embodiments, are now provided in connection with the following example.

Example

An example of an embodiment of performing package replication is now described in connection with the SAP Analytics Cloud (SAC) available from SAP SE of Walldorf, Germany.

SAC is deployed in the cloud, and combines analytics, planning, and predictive capabilities. In an analytics application, the analytics content can take various forms, including but not limited to:
model,
story,
visualizations,
Value Driver Tree (VDT), and
others.

Having this analytics content available can play an important role in discovering the unseen patterns to boost productivity. Hence sharing of the analytics content across users is helpful to promote collaboration. Moreover, the standard content template can be reused by all user by plugging in their corresponding data.

The Analytical Content Network (ACN) is the infrastructure for sharing analytics content in SAC. A package is the content entity that contains SAC content to be shared.

Figure 3:
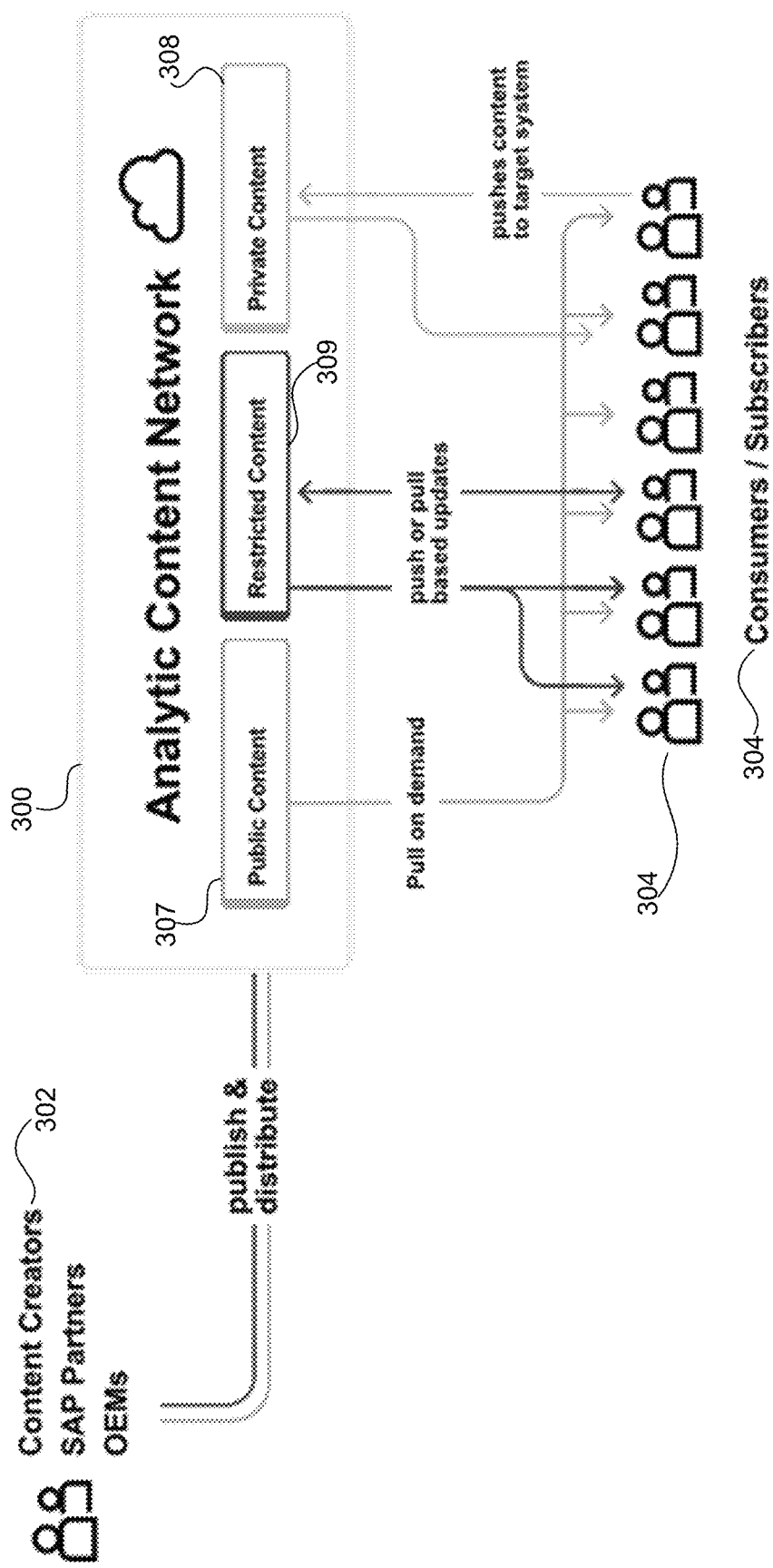
FIG. 3 shows an overview of a system according to an example.

FIG. 3 shows a simplified view of ACN 300. The ACN resides in SAC landscapes as a central component, connected to other components.

So, logically the ACN functions as one global content network which can provision or share SAC content. The ACN is connected out-of-the-box to any SAC tenant, and hence can provision and share content into the SAC tenant.

ACN supports various end-user workflows. In one workflow, a SAC content creator 302 creates SAC content in the form of stories, models, dimensions, connections, VDTs, and others. If authorized, the content creator can then export this content from the SAC tenant to ACN by creating a content package containing any number of these content items, and then share this content with multiple other tenants.

According to another workflow, a SAC content user 304 can view available content packages in their listing, and import relevant packages for their analytic workflows. This includes Public content 307 (e.g., Templates or Demo content) and Private Content 308 (content shared privately with that content user). And, as previously discussed the content can also be of a restricted type 309.

Figures 4, 5:
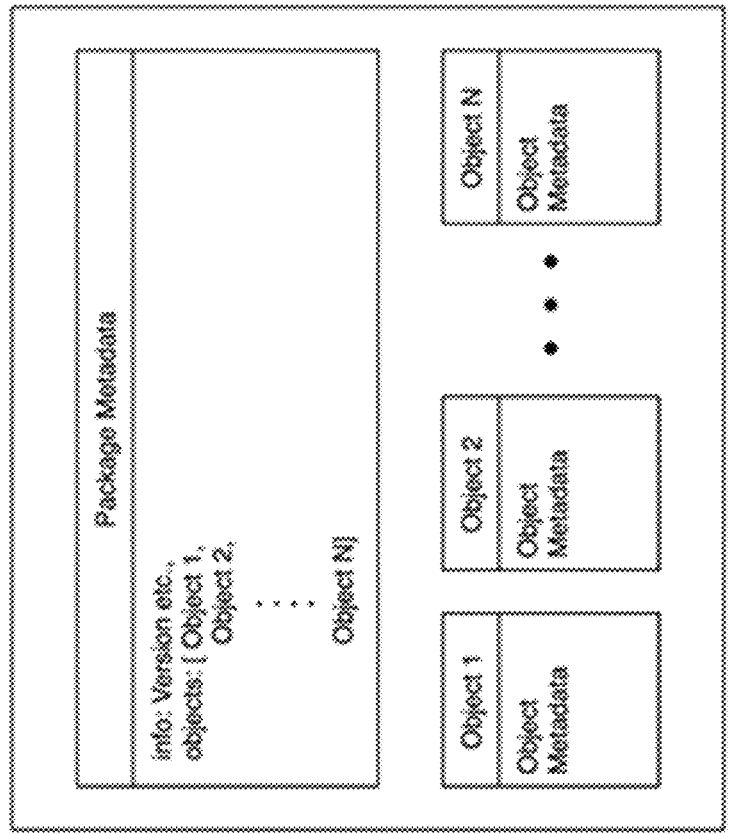
FIG. 4 shows an example content package.
FIG. 5 shows sample content package metadata.

FIG. 4 shows a simplified view of a sample package. FIG. 5 shows sample package metadata. A SAC package may include:
details of each object present in the package,
dependency information between those objects,
an overview summarizing content details.

Under some circumstances, a user may seek to replicate a package across different landscapes. This replication results in the creation of different copies of a same package.

Figure 6:
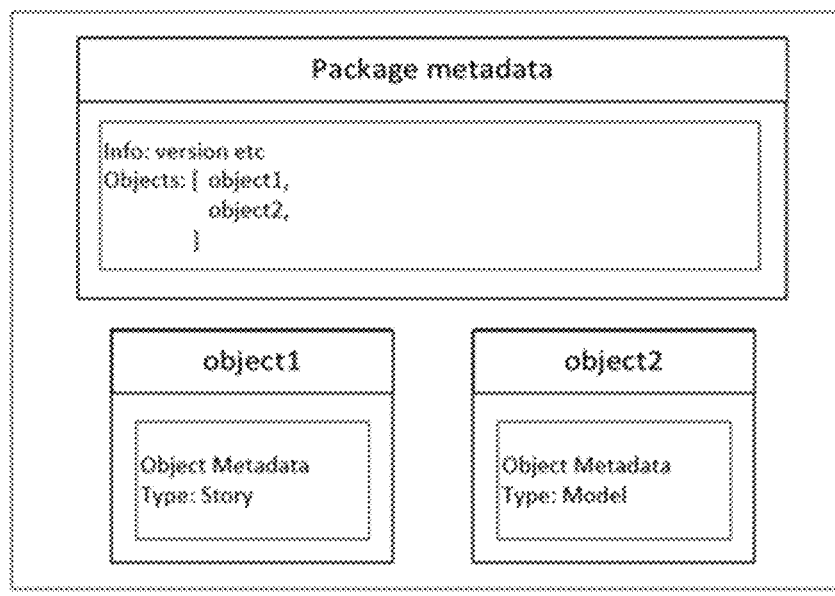
FIGS. 6-10 show different use cases.
Figure 7:
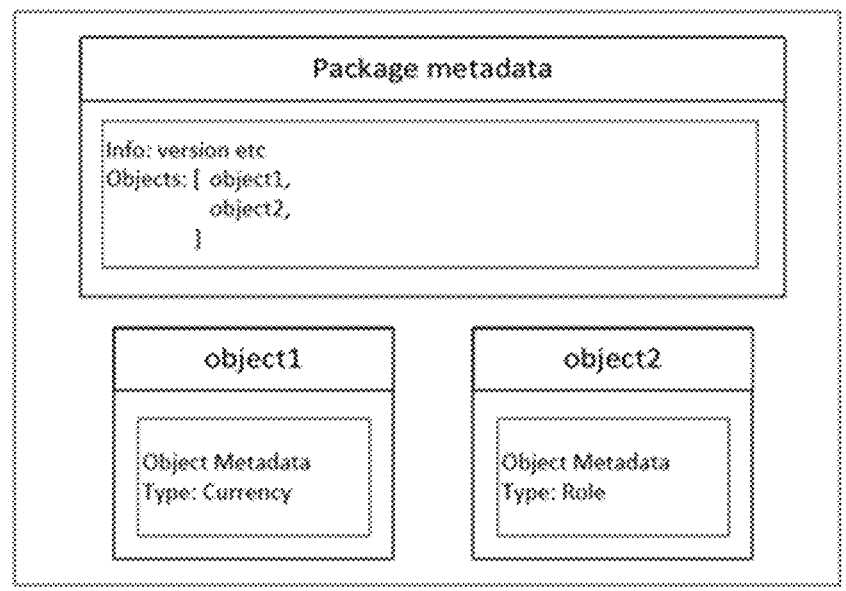
Figure 8:
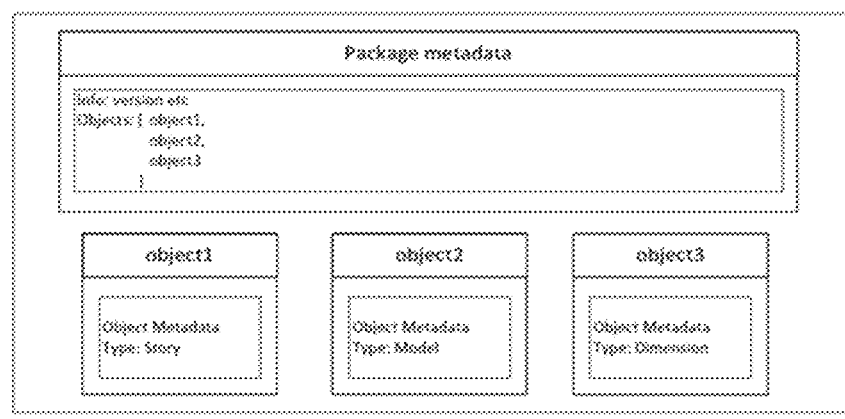
Figure 9:
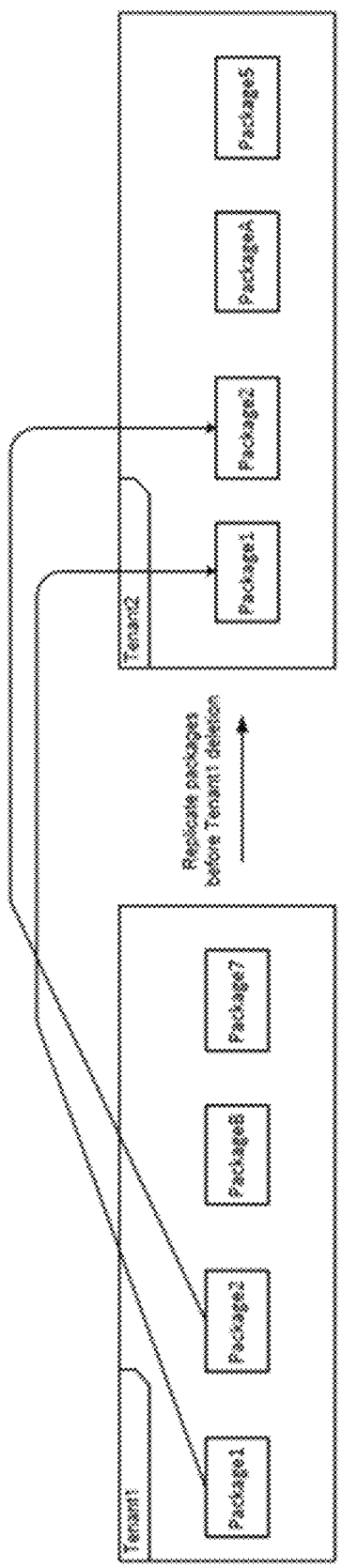
Figure 10:
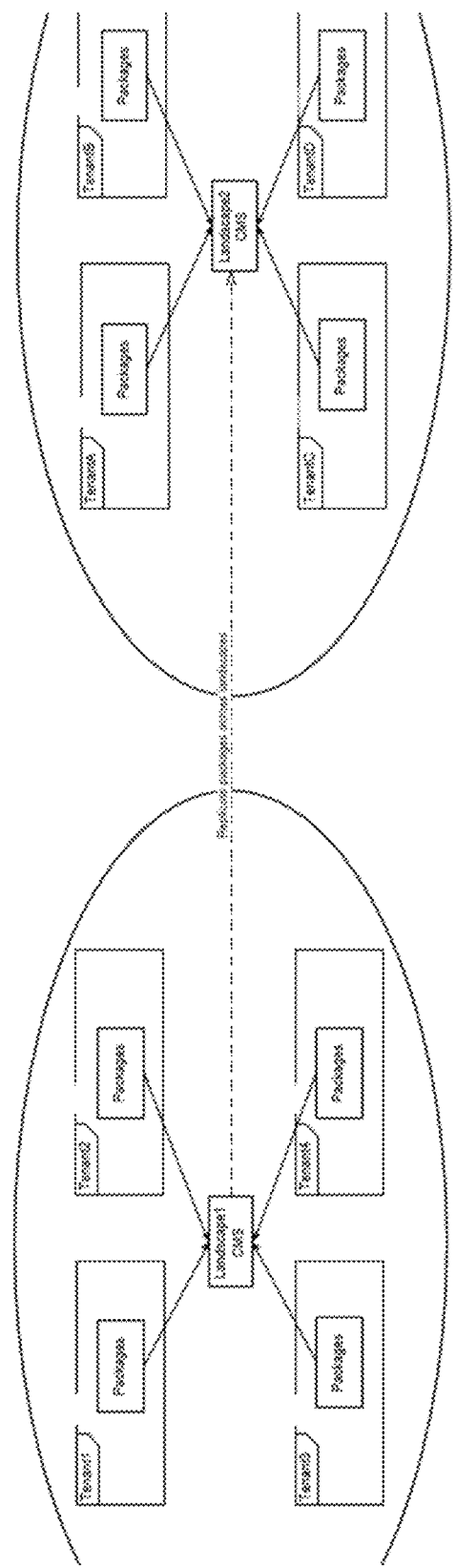

Package replication may be triggered for a variety of different types of packages. FIG. 6 shows a package containing non-system objects, such as story and model. FIG. 7 shows a package containing system objects such as currency and role. FIG. 8 shows a package containing both non-system and system objects—e.g., story, model, and dimension FIG. 9 shows a user created package replication in the case of a tenant deletion. FIG. 10 shows standard public package replication to all landscapes belonging to a particular Line of Business (LOB).

Under certain circumstances, one landscape (e.g., the landscape providing the package) may be open, while another landscape (e.g., the landscape for the replicated package) is restricted. In one example, the other landscape could be subject to laws governing the dissemination of private information, such as the General Data Protection Regulation (GDPR) guidelines for the European Data Protection Board (EUDP) landscape.

Accordingly, embodiments implement package replication across one or more restricted system landscapes. In particular, specific embodiments support replication of packages from open-to-restricted landscapes. Embodiments can also synchronize package replication job status as between restricted-to-open landscapes.

Embodiments copy package content from a source ContentManager Service (CMS) to a target CMS. Following replication, the source package and the target package are not associated, e.g., updating the content of one package does not impact the other package.

Figure 11:
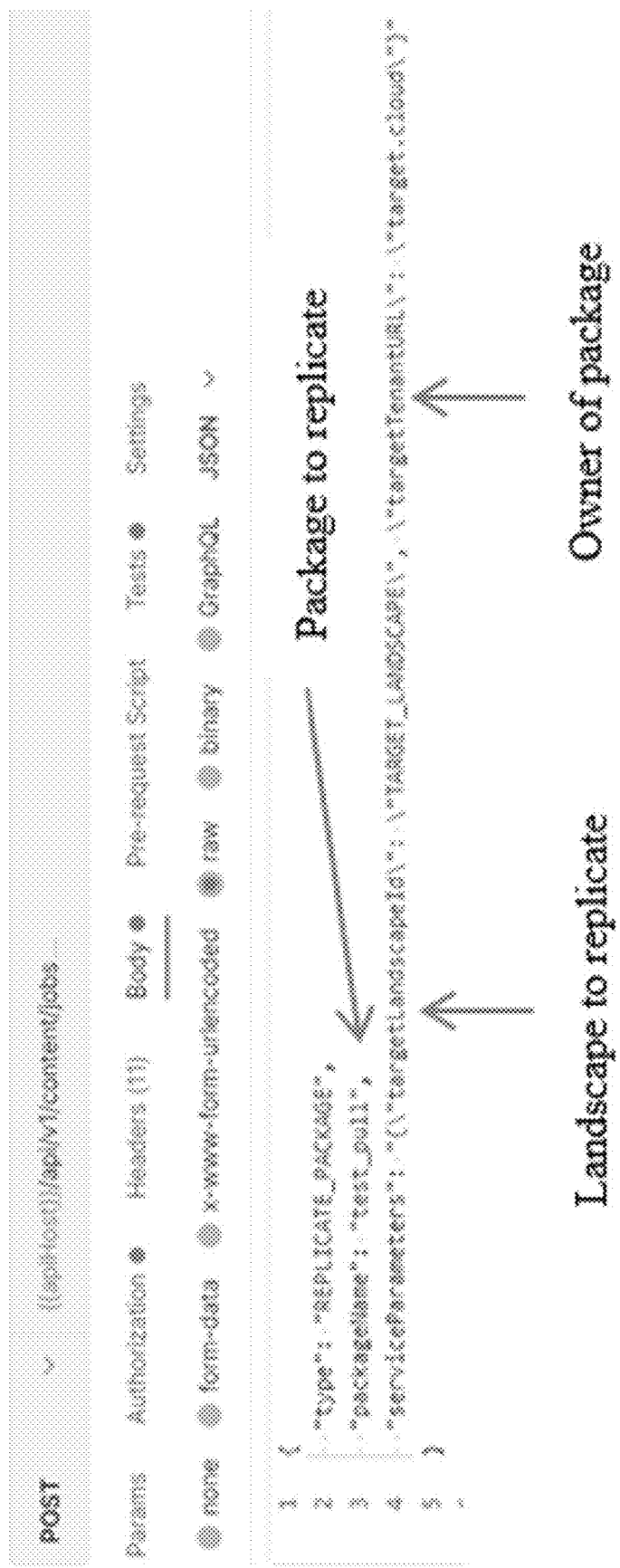
FIG. 11 shows sample instructions for a package replication.

FIG. 11 shows an example of a request to replicate a package. Users can perform operations on a replicated package just as with an exported package, e.g.: share with destinations, edit package to modify content, etc.

If a package has been created and exists in a landscape, it will be possible to replicate it to target landscape, irrespective of the package version. Details regarding creation of a package according to this example, are now discussed.

Figure 12:
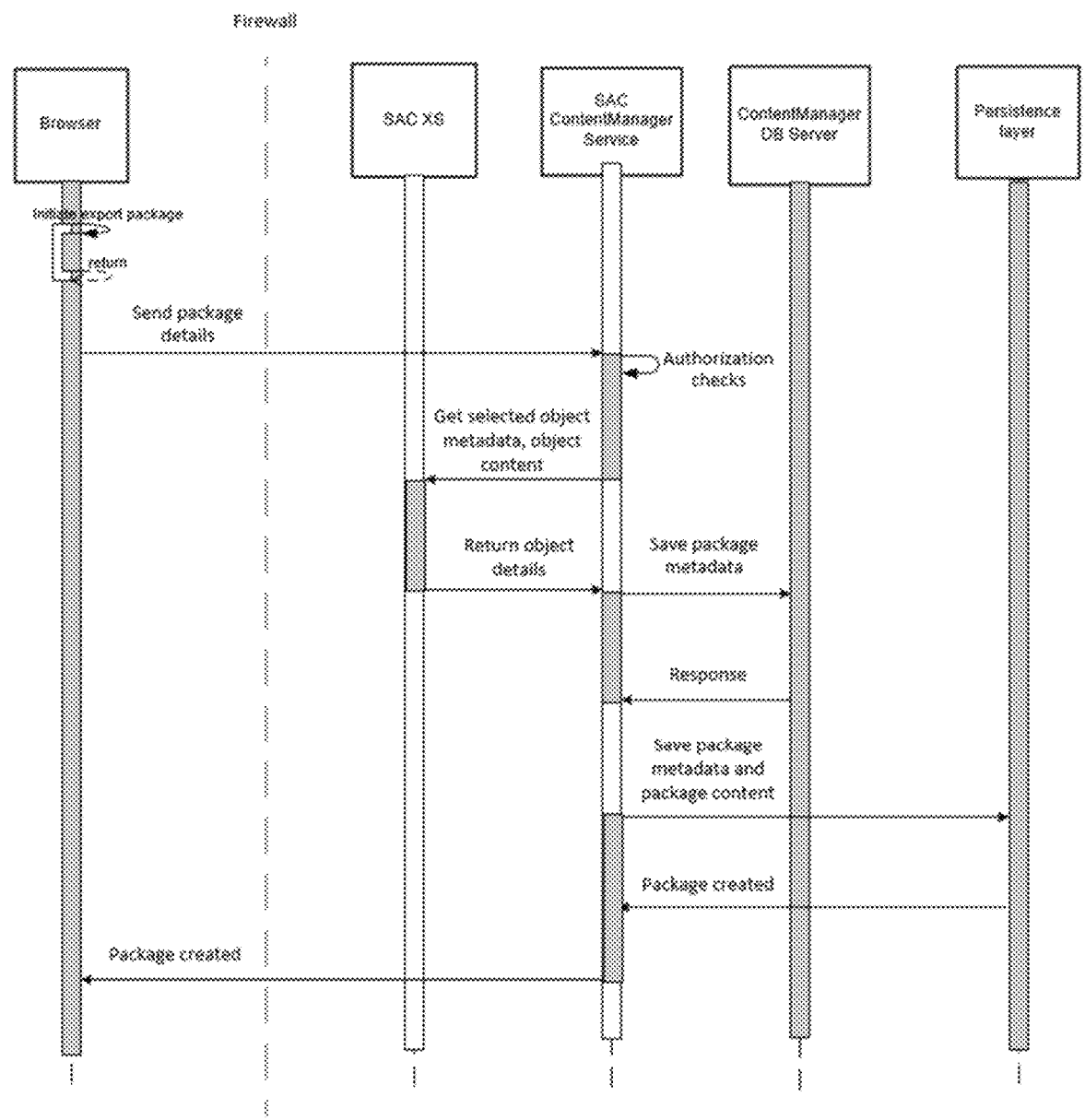
FIG. 12 shows a process flow for content package creation.
Figure 13A:
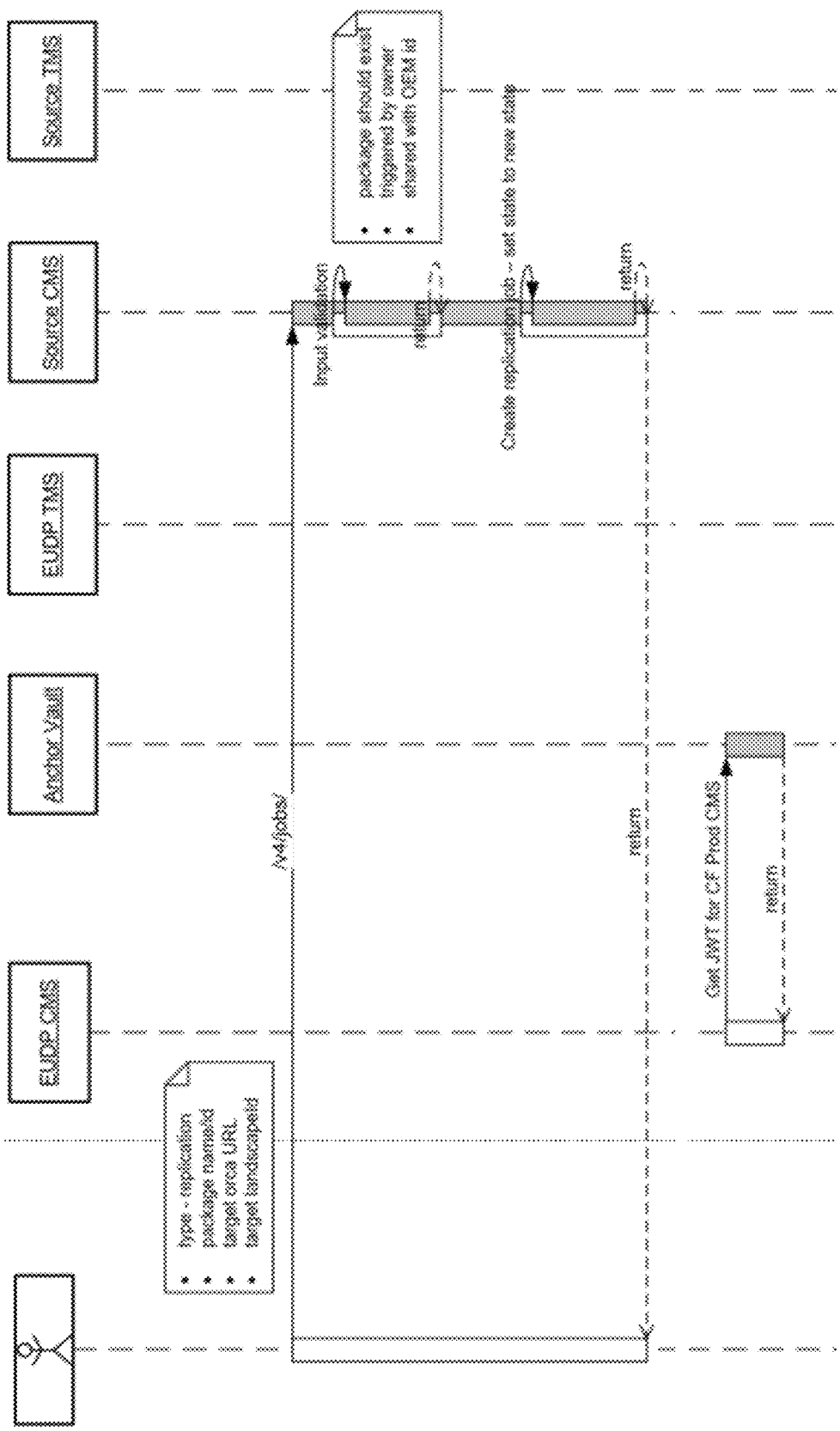
FIG. 13A-D show a process flow for package replication between open and restricted system landscapes.
Figure 13B:
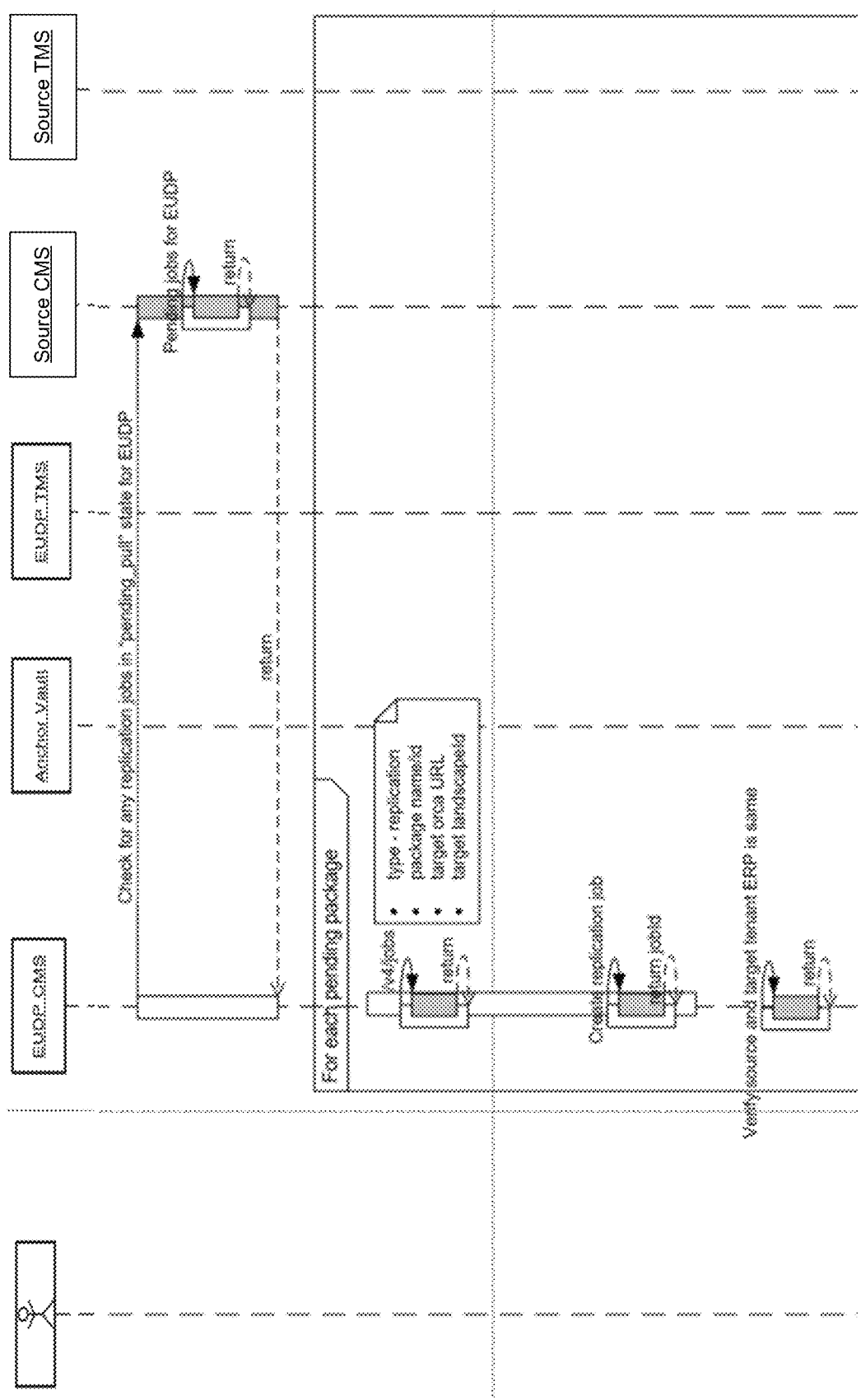
Figure 13C:
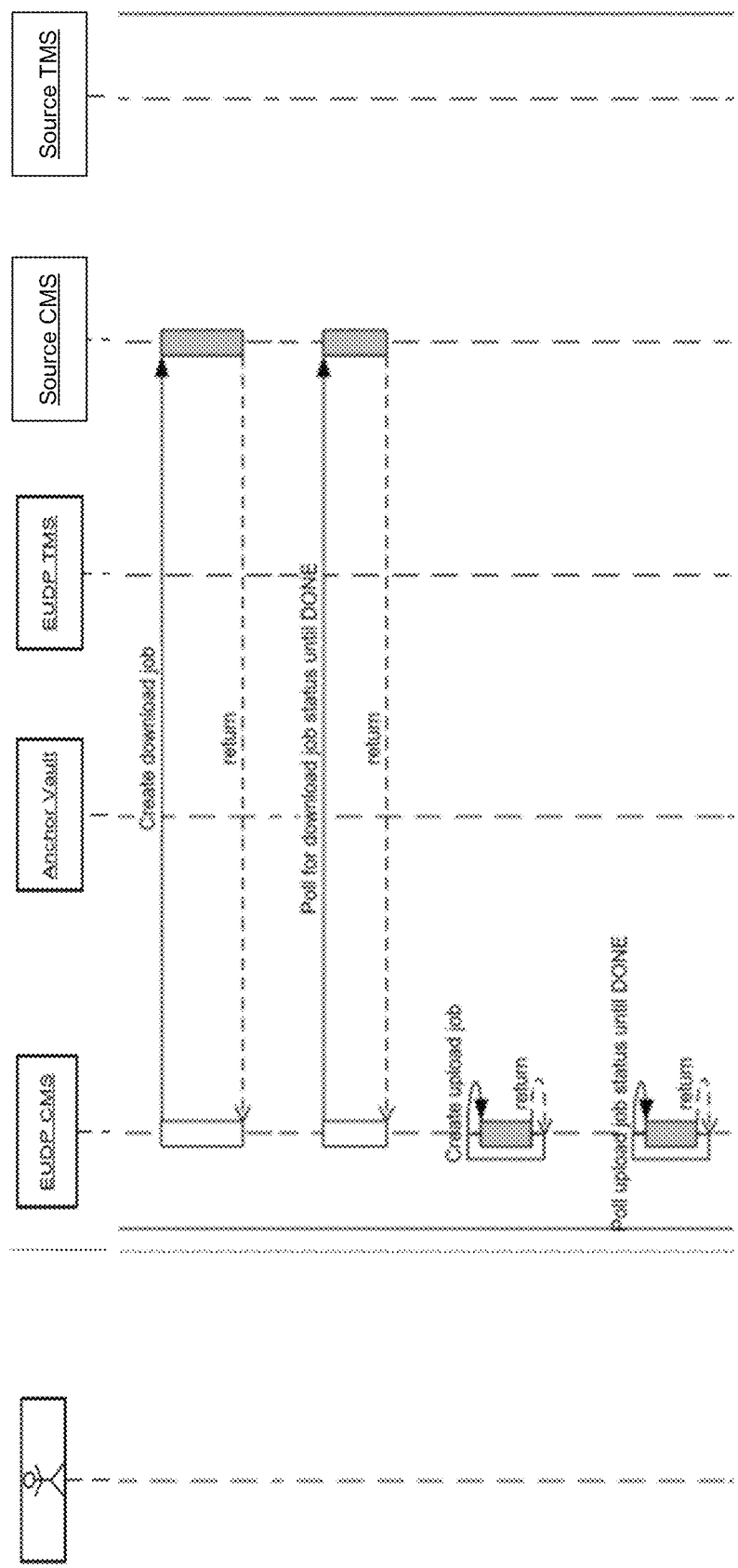
Figure 13D:
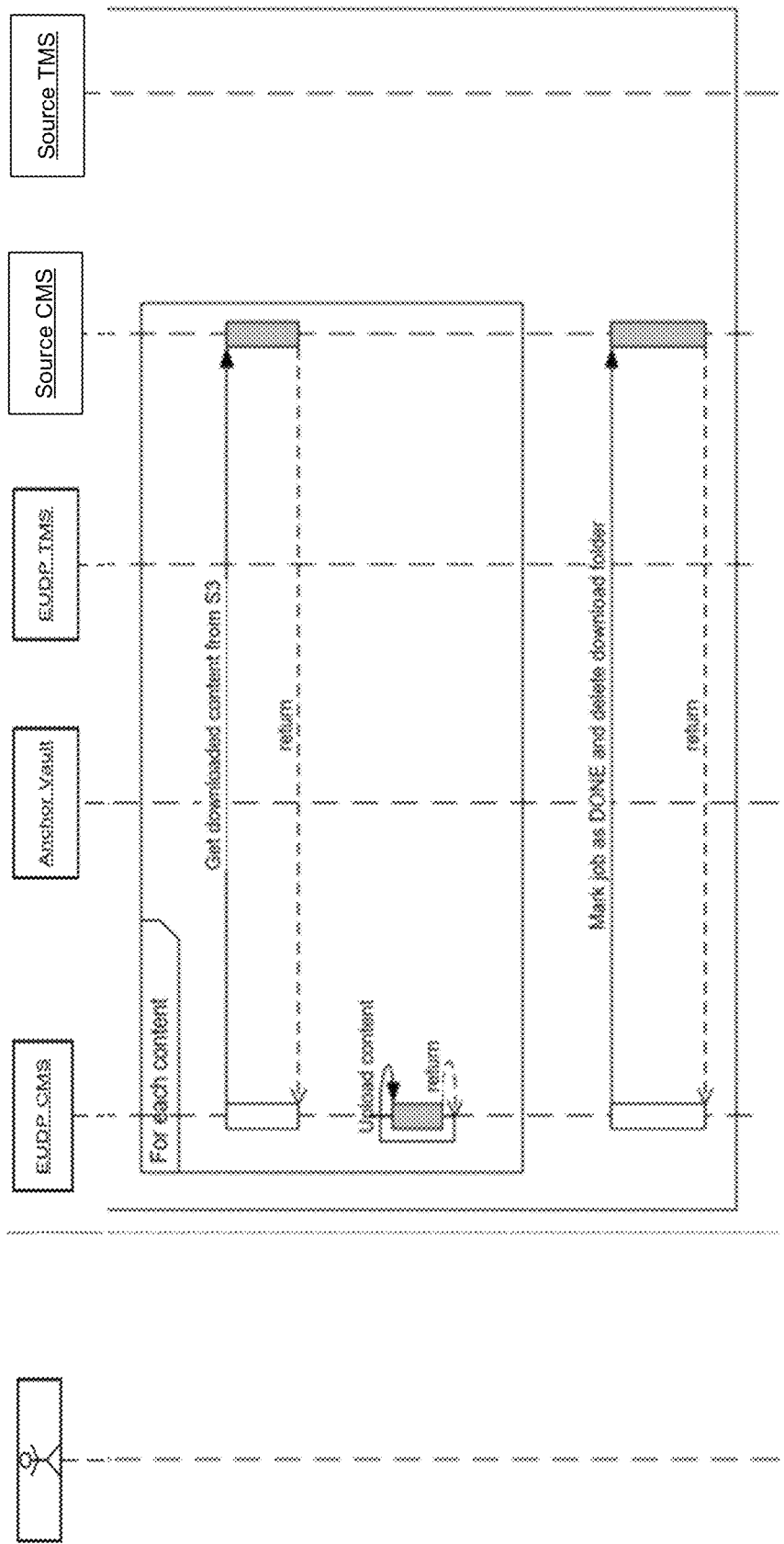

In order to create a package in SAC, the process shown in FIG. 12 is performed.
1. User clicks on "New Export" option to create a new package
2. Select objects like story, model, dimension, currency, roles, folder etc
3. Provide information like package name, description, details. Optionally share with destinations, selects Industry, LOB etc
4. Review package summary
5. Export package to create a new package Details regarding storage of the package and its metadata are now described. Whenever an ACN package is created, a summary called package metadata is formed. This summary includes information such as,
 the package version,
 list of objects in the package
 metadata for each object,
 dependencies and relationships between the objects.

The package metadata provides an overview of the contents of the package. This summary is bundled with the actual contents of the package as a JSON file and stored in persistence layer.

Before the package is stored in persistence, some details, e.g.:
 name of the package,
 description, and
 list of objects present in the package
are stored in the CMS database.

Replicating packages from open-to-open landscapes involves copying package content from a source CMS to a target CMS. Users can create replicas of packages, resulting in independent packages. This affords the freedom to modify package content without impacting source package content.

A procedure for replicating packages between open landscapes, is described below.
 a. User triggers replicate package job in source CMS
 b. Source CMS performs pre-requisite job parameters validations
 c. If all validation passes, then replicate package job is created
 d. Replicate package job state=PENDING
 e. Job is picked for execution
 f. Replicate package job state=EXECUTING
 g. Retrieve tenant details from Tenant Management Service (TMS) to compare source and target ERP
 h. Downloads package content from source CMS persistence layer
 i. Uploads package content to target CMS persistence layer
 j. Clean-up temporary folders
 k. Job is completed
 l. Replicate package job state=DONE/FAILED According to this open landscape-open landscape approach, the replicate package job is created and executed on source CMS only.

Embodiments of package replication involving a restricted landscape are now discussed. In particular, a poll-pull mechanism is applied. Specifically, an open landscape creates a replicate package job targeting to the restricted landscape.

The restricted landscape would periodically poll and check for any replicate package job for targeted for it. If targeted replicate package jobs are found, the restricted landscape will pull the job details to create a new replicate package job in its own (restricted) landscape.

Under this approach, according to embodiments even though the replicate package job was initiated in an open landscape, it will be executed in the restricted landscape. Hence for the EUDP landscape, operations would still be performed within the EU region.

FIGS. 13A-D show a simplified flow diagram of replicating a package from open-to-restricted landscapes.
 a. User triggers replicate package job targeting to EUDP landscape
 b. Source CMS performs pre-requisite job parameters validations
 c. If all validation passes, then replicate package job is created
 d. Replicate package job state=PENDING_PULL
 e. EUDP CMS runs scheduler every hour
  i. Checks for replicate package job in PENDING_PULL state
  ii. Checks for replicate package job targeted for EUDP landscape
  iii. Returns jobs satisfying condition e.i and e.ii
 f. For each returned job
  i. New replicate package job is created in EUDP landscape
  ii. Job is picked for execution
  iii. Replicate package job state=EXECUTING
  iv. Retrieve tenant details from Tenant Management Service (TMS) to compare source and target ERP
  v. Downloads package content from source CMS persistence layer
  vi. Uploads package content to target (ie EUDP) CMS persistence layer
  vii. Clean-up temporary folders
  viii. Job is completed
  ix. Replicate package job state=DONE/FAILED Here, the replicate package job is created on the source CMS, but is executed on the target (e.g., EUDP) CMS.

The status of a package replication job between open and restricted landscapes may need to be accurately determined. This can be done by the replicate package job propagating the current state of its job to the open landscape replicate package job. This accomplishes synchronizing the job status across the different landscapes.

Figure 14A:
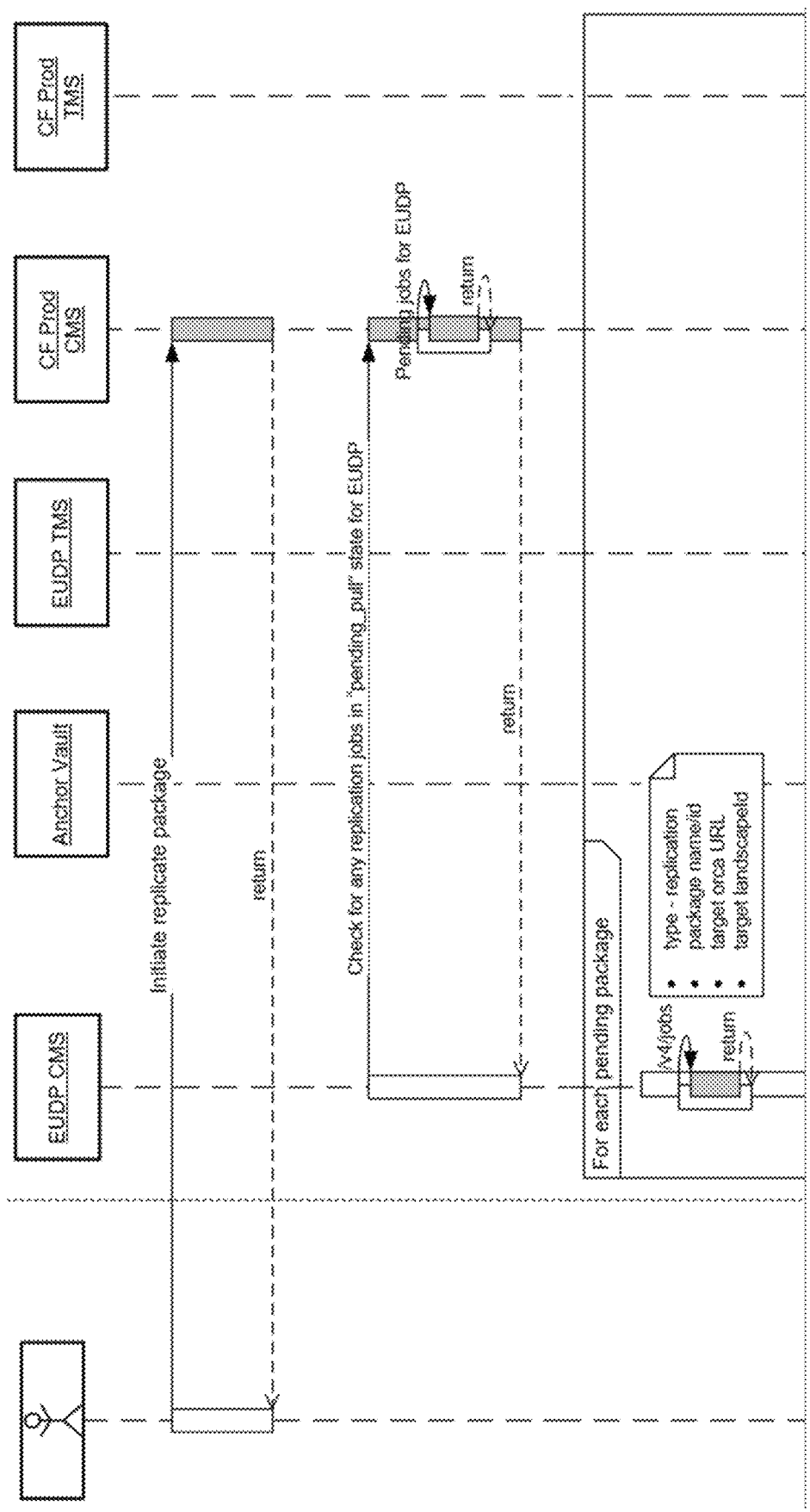
FIGS. 14A-B show a package replication job status process flow.
Figure 14B:
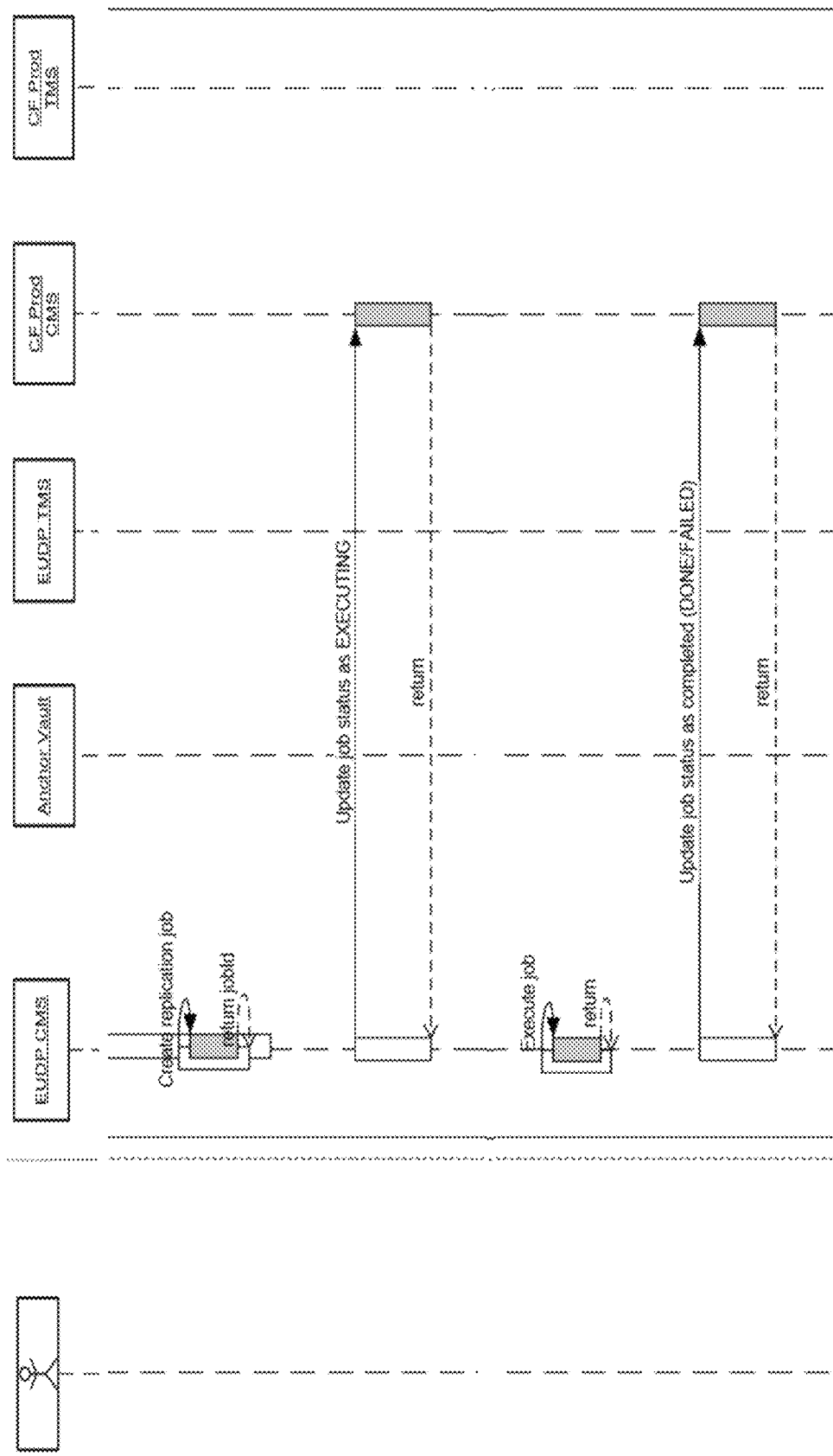

FIGS. 14A-B show a simplified flow diagram illustrating synchronizing replicate package job status between restricted-to-open landscapes.
 a. User triggers replicate package job targeting to EUDP landscape
 b. Source CMS performs pre-requisite job parameters validations c. If all validation passes, then replicate package job is created
d. Replicate package job state=PENDING_PULL
e. EUDP CMS runs scheduler every hour
  i. Checks for replicate package job in PENDING_PULL state
  ii. Checks for replicate package job targeted for EUDP landscape
  iii. Returns jobs satisfying condition e.i and e.ii
f. For each returned job
  i. New replicate package job is created in EUDP landscape
  ii. Update replicate package job state in source CMS=EXECUTING
  iii. Job is picked for execution
  iv. Replicate package job state=EXECUTING
  v. Retrieve tenant details from Tenant Management Service (TMS) to compare source and target ERP
  vi. Downloads package content from source CMS persistence layer
  vii. Uploads package content to target (ie EUDP) CMS persistence layer
  viii. Clean-up temporary folders
  ix. Job is completed
  x. Replicate package job state=DONE/FAILED
  xi. Update replicate package job state in source CMS=DONE/FAILED The package replication utilizing a poll-pull mechanism according to embodiments, offers one or more benefits. One benefit is a unified experience to the user. That is, behind the scenes, job creation and job execution are happening in two different landscapes. However, the end-user replicating package from open-to-open and open-to-restricted landscape experiences a similar environment. Moreover, a user continues to be informed on the status of the package replication job.

Returning now to FIG. 1, there the particular embodiment is depicted with the engine as being located outside of the database. However, this is not required.

Rather, alternative embodiments could leverage the processing power of an in-memory database engine (e.g., the in-memory database engine of the HANA in-memory database available from SAP SE), in order to perform various functions as described above.

Figure 15:
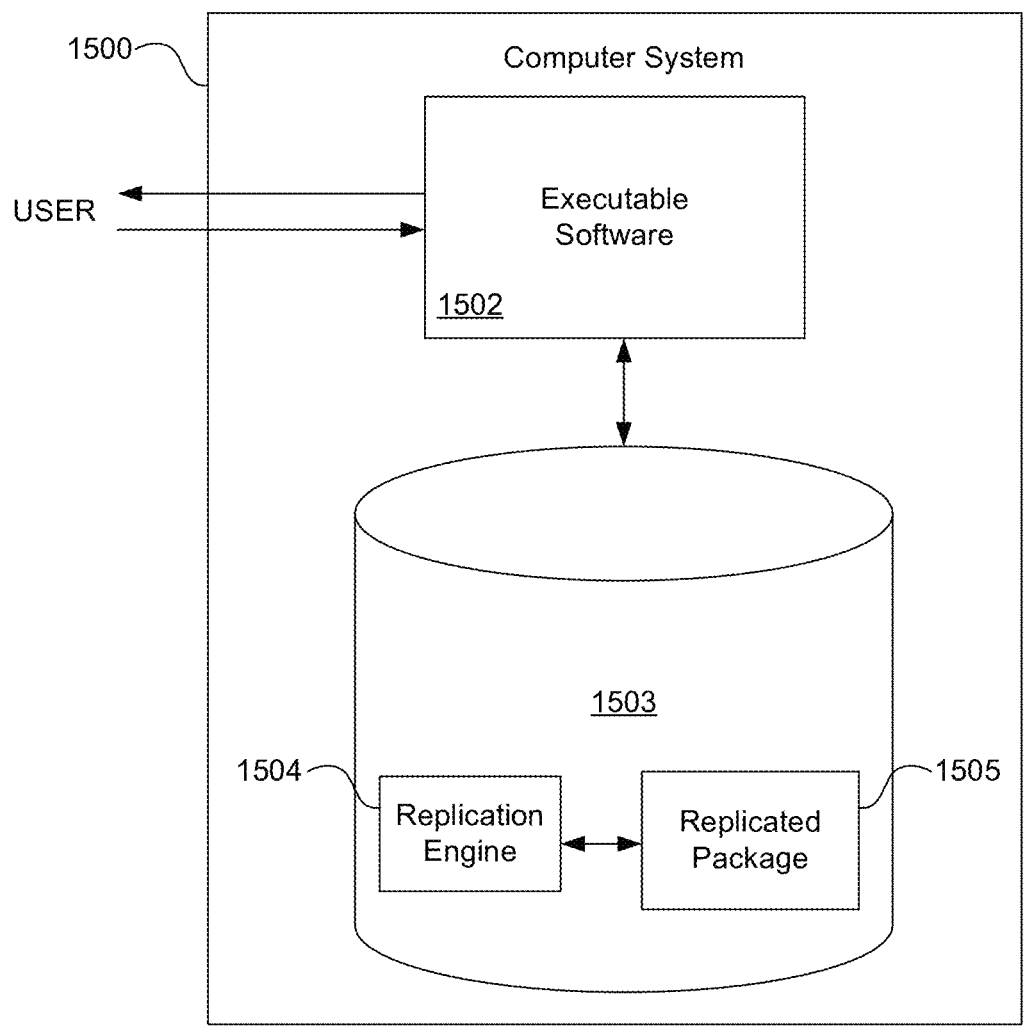
FIG. 15 illustrates hardware of a special purpose computing machine configured for implementing package replication according to embodiments.

Thus FIG. 15 illustrates hardware of a special purpose computing machine configured to perform package replication according to an embodiment. In particular, computer system 1501 comprises a processor 1502 that is in electronic communication with a non-transitory computer-readable storage medium comprising a database 1503. This computer-readable storage medium has stored thereon code 1505 corresponding to a replication engine. Code 1504 corresponds to a replicated package. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:
issuing a poll to a source landscape;
in response to the poll, receiving a poll result indicating a first replication job including a data type of the first landscape;
detecting the first replication job from the poll result;
in response to the first replication job, referencing a landscape restriction to generate a pull request;
issuing the pull request to the source landscape;
in response to the pull request, receiving from the source landscape a content package; and
storing the content package in a non-transitory computer readable storage medium.

Example 2. The computer implemented system and method of Example 1 further comprising communicating a status to the source landscape.

Example 3. The computer implemented system and method of Examples 1 or 2 wherein the landscape restriction is based on privacy.

Example 4. The computer implemented system and method of Examples 1, 2, or 3 wherein a target landscape issues the poll and the pull request to the source landscape, and the first replication job specifies the target landscape.

Example 5. The computer implemented system and method of Examples 1, 2, 3, or 4 wherein the first replication job specifies an owner, and the content package is stored in an owner space of the non-transitory computer readable storage medium.

Example 6. The computer implemented system and method of Example 5 wherein the owner space is defined in a database.

Example 7. The computer implemented system and method of Examples 1, 2, 3, 4, 5, or 6 wherein the non-transitory computer readable storage medium comprises a database.

Example 8. The computer implemented system and method of Examples 1, 2, 3, 4, 5, 6, or 7 wherein the non-transitory computer readable storage medium comprises an in-memory database, and an in-memory database engine of the in-memory database stores the content package in the in-memory database.

Figure 16:
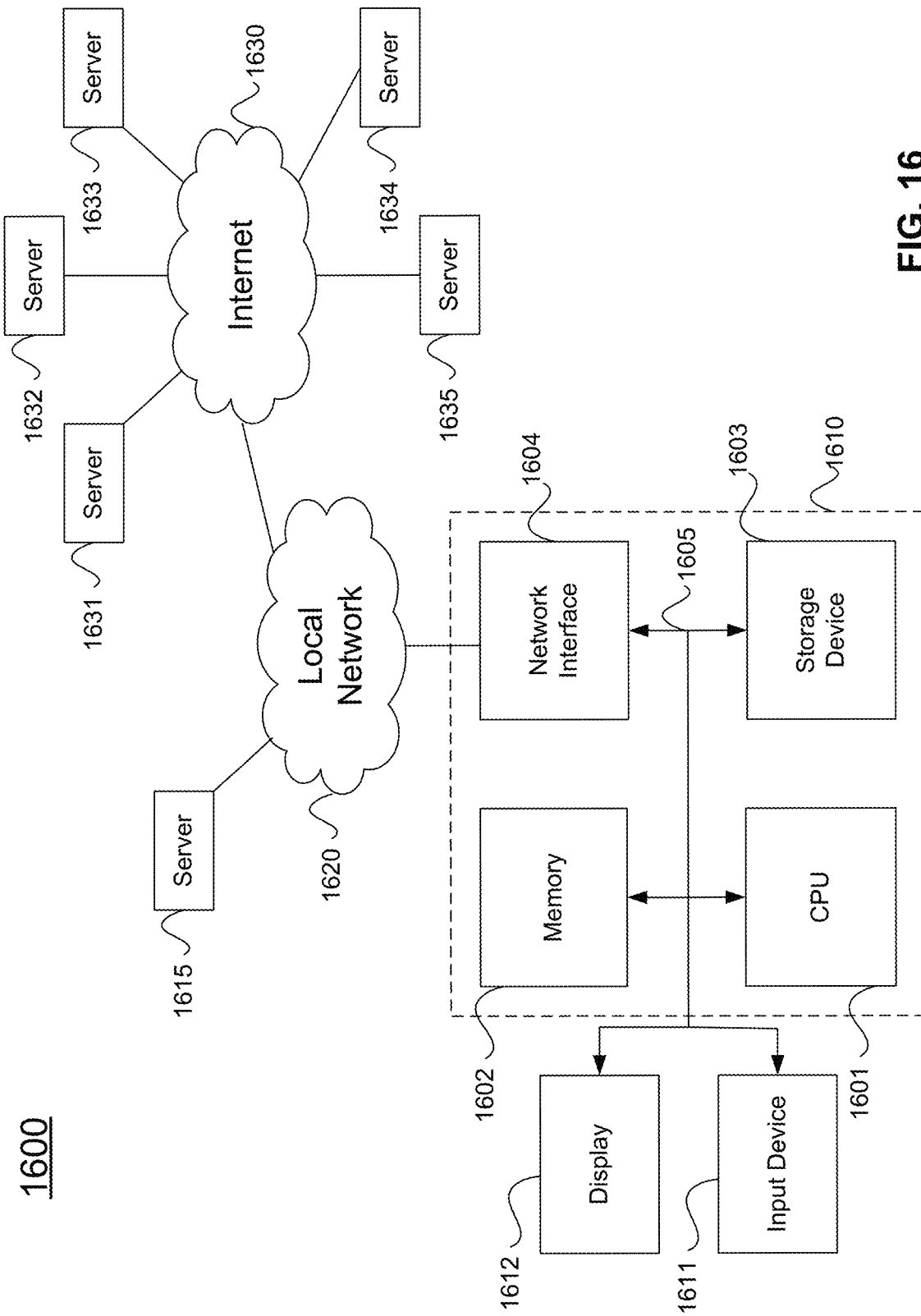
FIG. 16 illustrates an example computer system.

An example computer system 1600 is illustrated in FIG. 16. Computer system 1610 includes a bus 1605 or other communication mechanism for communicating information, and a processor 1601 coupled with bus 1605 for processing information. Computer system 1610 also includes a memory 1602 coupled to bus 1605 for storing information and instructions to be executed by processor 1601, including information and instructions for performing the techniques described above, for example. This memory may also be used for storing variables or other intermediate information during execution of instructions to be executed by processor 1601. Possible implementations of this memory may be, but are not limited to, random access memory (RAM), read only memory (ROM), or both. A storage device 1603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1603 may include source code, binary code, or software files for performing the techniques above, for example. Storage device and memory are both examples of computer readable mediums.

Computer system 1610 may be coupled via bus 1605 to a display 1612, such as a Light Emitting Diode (LED) or liquid crystal display (LCD), for displaying information to a computer user. An input device 1611 such as a keyboard and/or mouse is coupled to bus 1605 for communicating information and command selections from the user to processor 1301. The combination of these components allows the user to communicate with the system. In some systems, bus 1605 may be divided into multiple specialized buses.

Computer system 1610 also includes a network interface 1604 coupled with bus 1605. Network interface 1604 may provide two-way data communication between computer system 1610 and the local network 1620. The network interface 1604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1304 sends and receives electrical, electromagnetic, or optical signals that carry digital data streams representing various types of information.

Computer system 1610 can send and receive information, including messages or other interface actions, through the network interface 1604 across a local network 1620, an Intranet, or the Internet 1630. For a local network, computer system 1610 may communicate with a plurality of other computer machines, such as server 1615. Accordingly, computer system 1610 and server computer systems represented by server 1615 may form a cloud computing network, which may be programmed with processes described herein. In the Internet example, software components or services may reside on multiple different computer systems 1610 or servers 1631-1635 across the network. The processes described above may be implemented on one or more servers, for example. A server 1631 may transmit actions or messages from one component, through Internet 1630, local network 1620, and network interface 1604 to a component on computer system 1610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    on a source landscape,
        receiving, in a source content management service from a target content management service, an instruction to replicate a content package;
        retrieving, by the source content management service, one or more objects and metadata for the one or more objects from a landscape server, the content package comprising the one or more objects and the metadata for the one or more objects;
        storing, by the source content management service, the content package;
        determining whether the target content management service is restricted or open;
        creating, by the source content management service, a first replication job to replicate the content package on the target content management service, wherein when the target content management service is open, the source content management service executes the replication job to replicate the content package on the target content management service, and wherein when the target content management service is restricted, the source content management service sets a replication job status to pending pull;
    on a restricted target landscape comprising the target content management service;
        issuing a poll to the source content management service;
        in response to the poll, receiving a poll result indicating the replication job status is pending pull;
        in response to the first replication job status being pending pull, generating a second replication job on the target content management service to generate a pull request;
        issuing the pull request to the source content management service;
        in response to the pull request, receiving from the source content management service the content package; and
        storing the content package in a non-transitory computer readable storage medium.

2. A method as in claim 1 further comprising communicating a status to the source landscape.

3. A method as in claim 1 wherein:
    the first replication job specifies an owner; and
    the content package is stored in an owner space of the non-transitory computer readable storage medium.

4. A method as in claim 3 wherein the owner space is defined in a database.

5. A method as in claim 1 wherein the non-transitory computer readable storage medium comprises a database.

6. A method as in claim 1 wherein:
    the restricted target landscape issues the poll and the pull request to the source landscape; and
    the first replication job specifies the restricted target landscape.

7. A method as in claim 1 wherein a restriction on the restricted target landscape is based on privacy.

8. A method as in claim 1 wherein:
    the non-transitory computer readable storage medium comprises an in-memory database; and
    an in-memory database engine of the in-memory database stores the content package in the in-memory database.

9. A method as in claim 8 wherein the in-memory database engine performs at least one of:
    issuing the poll;
    receiving the poll result;
    generating the pull request; and
    issuing the pull request.

10. A non-transitory computer readable storage medium embodying a computer program for performing a method, said method comprising:
    on a source landscape,
        receiving, in a source content management service from a target content management service, an instruction to replicate a content package;
        retrieving, by the source content management service, one or more objects and metadata for the one or more objects from a landscape server, the content package comprising the one or more objects and the metadata for the one or more objects;

storing, by the source content management service, the content package;

determining whether the target content management service is restricted or open;

creating, by the source content management service, a first replication job to replicate the content package on the target content management service, wherein when the target content management service is open, the source content management service executes the replication job to replicate the content package on the target content management service, and wherein when the target content management service is restricted, the source content management service sets a replication job status to pending pull;

on a restricted target landscape comprising the target content management service;

issuing a poll to the source content management service;

in response to the poll, receiving a poll result indicating the replication job status is pending pull;

in response to the replication job status being pending pull, generating a second replication job on the target content management service to generate a pull request;

issuing the pull request to the source content management service;

in response to the pull request, receiving from the source content management service the content package; and storing the content package in a non-transitory computer readable storage medium.

11. A non-transitory computer readable storage medium as in claim 10 wherein:

the first replication job specifies an owner; and the content package is stored in an owner space of the database.

12. A non-transitory computer readable storage medium as in claim 10 wherein the method further comprises communicating a status to the source landscape.

13. A non-transitory computer readable storage medium as in claim 10 wherein:

the restricted target landscape issues the poll and the pull request to the source landscape; and the first replication job specifies the restricted target landscape.

14. A non-transitory computer readable storage medium as in claim 10 wherein a restriction on the restricted target landscape is based on privacy.

15. A computer system comprising:

one or more processors;

a software program, executable on said computer system, the software program configured to cause an in-memory database engine of an in-memory database to:

on a source landscape, receive, in a source content management service from a target content management service, an instruction to replicate a content package;

retrieve, by the source content management service, one or more objects and metadata for the one or more objects from a landscape server, the content package comprising the one or more objects and the metadata for the one or more objects;

store, by the source content management service, the content package;

determine whether the target content management service is restricted or open;

create, by the source content management service, a first replication job to replicate the content package on the target content management service, wherein when the target content management service is open, the source content management service executes the replication job to replicate the content package on the target content management service, and wherein when the target content management service is restricted, the source content management service sets a replication job status to pending pull;

on a restricted target landscape comprising the target content management service, issue a poll to the source content management service;

in response to the poll, receive a poll result indicating the replication job status is pending pull;

in response to the replication job status being pending pull, generate a second replication job on the target content management service to generate a pull request;

issue the pull request to the source content management service;

in response to the pull request, receive from the source content management service the content package; and store the content package in a non-transitory computer readable storage medium.

16. A computer system as in claim 15 further comprising the in-memory database communicating a status to the source landscape.

17. A computer system as in claim 15 wherein:

the first replication job specifies an owner; and the content package is stored in an owner space of the in-memory database.

18. A computer system as in claim 15 wherein the content package further includes at least one of:

name of the content package;

a description of the content package;

a list of objects present in the content package.

19. A computer system as in claim 15 wherein:

the in-memory database is part of a target landscape; and the first replication job specifies the target landscape.

20. A computer system as in claim 15 wherein a restriction on the restricted target landscape is based on privacy.

* * * * *